Aug. 26, 1930.   G. F. WOELFEL   1,773,836
METHOD AND MEANS FOR FORMING NUT BLANK BARS
Original Filed Aug. 10, 1926   3 Sheets-Sheet 1

INVENTOR:
GEORGE F. WOELFEL
BY George W. Saywell
ATTORNEY

Aug. 26, 1930.   G. F. WOELFEL   1,773,836
METHOD AND MEANS FOR FORMING NUT BLANK BARS
Original Filed Aug. 10, 1926   3 Sheets-Sheet 2

INVENTOR:
GEORGE F. WOELFEL
BY
ATTORNEY

Aug. 26, 1930.   G. F. WOELFEL   1,773,836
METHOD AND MEANS FOR FORMING NUT BLANK BARS
Original Filed Aug. 10, 1926   3 Sheets-Sheet 3

INVENTOR:
GEORGE F. WOELFEL
BY
ATTORNEY

Patented Aug. 26, 1930

1,773,836

UNITED STATES PATENT OFFICE

GEORGE F. WOELFEL, OF LAKEWOOD, OHIO, ASSIGNOR TO THE COMMERCIAL CLEARING CORPORATION, OF JACKSONVILLE, FLORIDA, A CORPORATION OF FLORIDA

METHOD AND MEANS FOR FORMING NUT-BLANK BARS

Application filed August 10, 1926, Serial No. 128,394. Renewed November 23, 1929.

My invention relates to nut-blank bars and methods of forming the same, and particularly relates to articles and methods of this character in which hot blank bars are operated upon by rolls formed with narrow teeth and with inter-teeth surfaces of a certain character hereinafter fully described, to form the nut-blank bar with a minimum loss of material and with a minimum number of operations. The invention further relates to improved rolls for making nut-blank bars.

The annexed drawings and the following description set forth in detail certain means embodying my invention and certain steps by which my improved method may be carried out, such means and steps constituting, however, but one of the various forms in which the principle of the invention may be applied and but one of the various series of steps by which the improved method may be carried out.

Figures 2, 17:
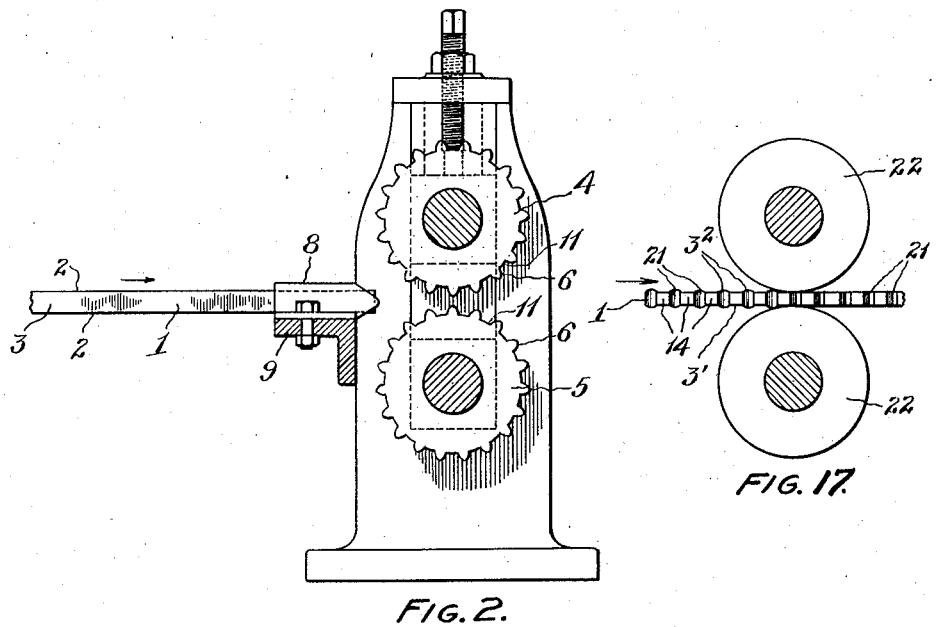
Figure 2 is a vertical transverse section, taken in the plane indicated by the line II—II, Figure 1.
Figure 1:
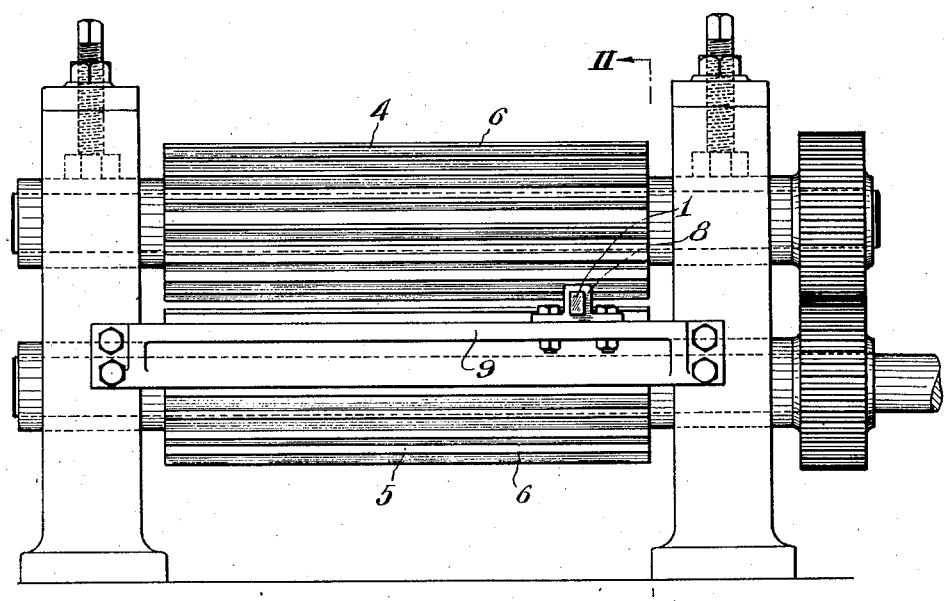
Figure 1 represents a front elevation of a complete machine for rolling my improved nut-blank bar by my new method, the same showing a pair of rolls of improved construction forming part of this machine.
Figure 3:
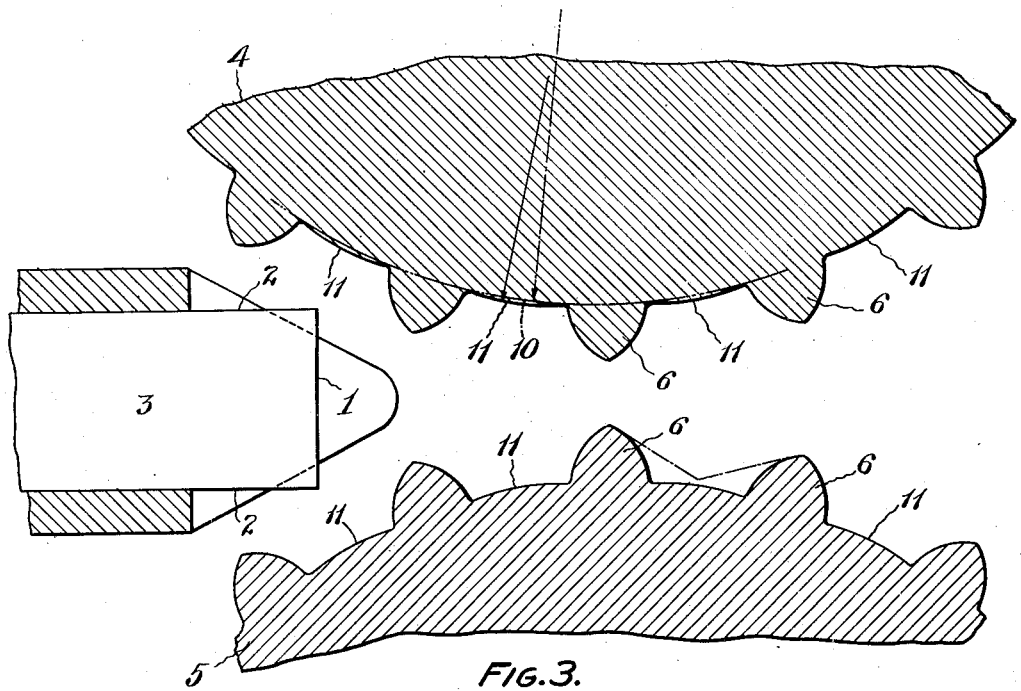
Figure 3 is a vertical transverse section, upon an enlarged scale, of a portion of the rolls shown in Figure 2, together with a side elevation of a portion of the bar blank and suitable guides therefor.
Figure 5:
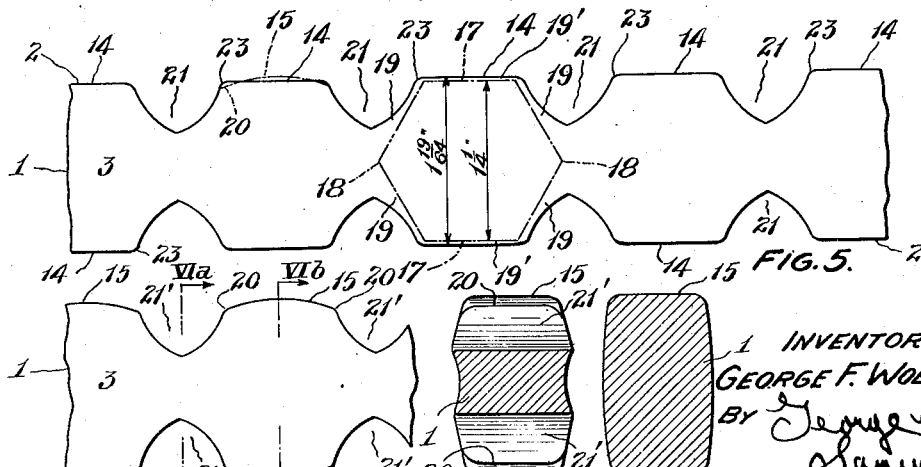
Figures 6, 6A, 6B:
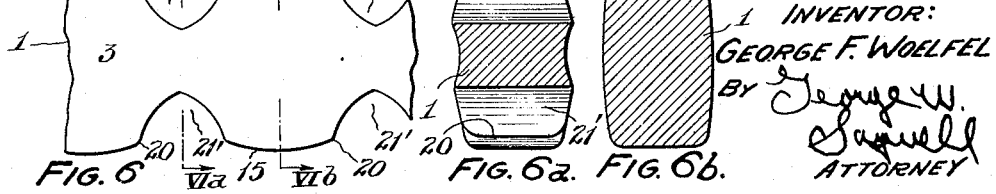
Figure 8:
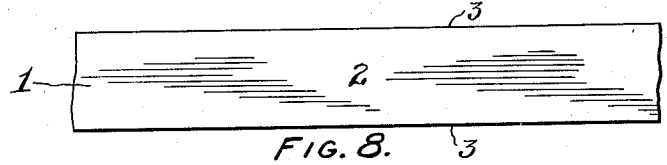
Figure 7:
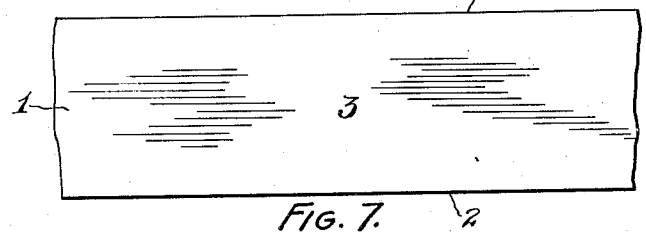
Figure 10:
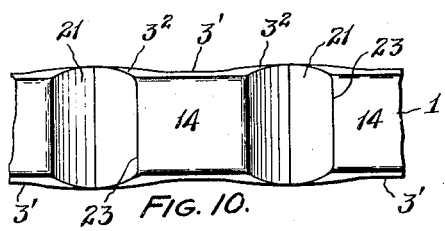
Figure 14:
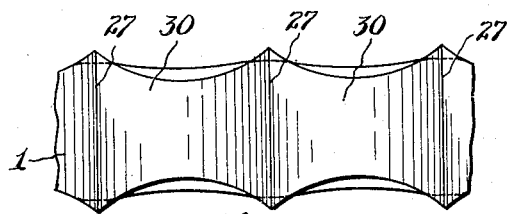
Figure 9:
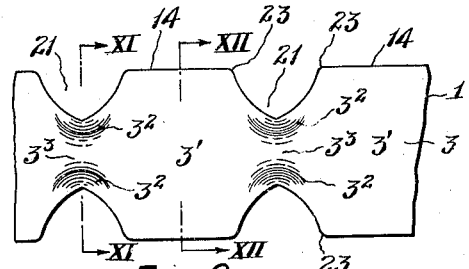
Figure 13:
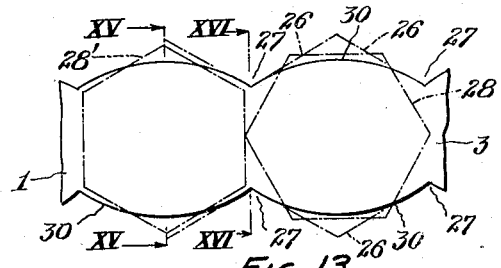
Figure 11:
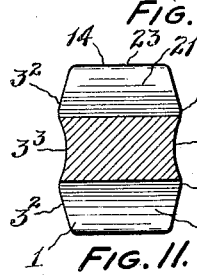
Figure 12:
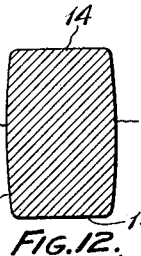
Figure 16:
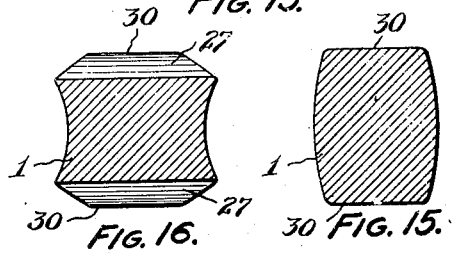
Figure 15:
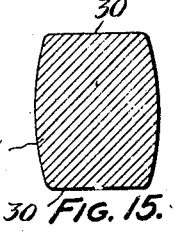
Figure 19:
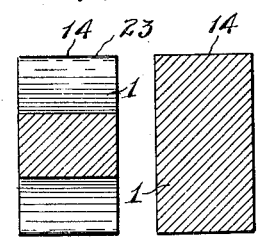
Figure 20:
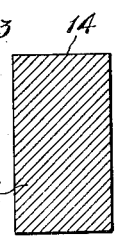
Figure 18:
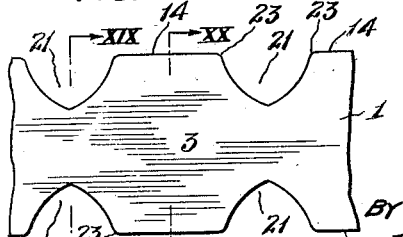

Figure 5 is a side view of a portion of the bar blank, after the latter has been passed through the rolls, the view being somewhat diagrammatic, as compared with a similar showing in Figure 9; there being shown in dot-and-dash lines between two of the recesses the formation which this blank would take, if the rolls did not press upon the bar blank between the teeth in a manner hereinafter fully described;

Figure 6 is a fragmentary side view of a bar blank which has been operated upon by rolls similar to those shown in Figure 3 except that they are formed so as not to provide pressure on the blank between adjacent teeth, as hereinafter fully described;

Figures 6$^a$ and 6$^b$ are vertical sections taken, respectively, in the planes indicated by the lines VI$^a$—VI$^a$ and VI$^b$—VI$^b$, Figure 6;

Figures 7 and 8 are a side elevation and a plan view, respectively, of the bar blank;

Figure 9 is a side elevation of a portion of the bar blank, after passing through the rolls shown in Figure 3;

Figure 10 is a plan view of the nut-blank bar shown in Figure 9;

Figures 11 and 12 are vertical sections taken, respectively, in the planes indicated by the lines XI—XI and XII—XII, Figure 9;

Figure 13 is a fragmentary side elevation of the bar blank shown in Figures 7 and 8 after being operated upon by rolls having blunt teeth, in distinction from rolls having sharp teeth, as shown in Figure 3;

Figure 14 is a plan view of the nut-blank bar shown in Figure 13;

Figures 15 and 16 are vertical sections, taken, respectively, in the planes indicated by the lines XV—XV and XVI—XVI, Figure 13;

Figure 17 is a view showing how the nut-blank bar formed by being passed through rolls shown in Figure 3 is afterwards flattened by being passed through rolls such as shown in this Figure 17, this flattening step pressing the slight protuberances formed by the rolls of Figure 3 back into the bar;

Figure 18 is a fragmentary side elevation of the nut-blank bar shown in Figure 9, after the same has been passed through the flattening rolls shown in Figure 17; and Figures 19 and 20 are vertical sections taken, respectively, in the planes indicated by the lines XIX—XIX and XX—XX, Figure 18.

In the production of my new and improved nut-blank bar and the use of my improved method of manufacture, I utilize a rectangular bar 1 of the dimensions, for instance, three-quarters (¾) inch for the face 2 and one and three-eighths (1-3/8) inch for the side 3, assuming that I propose to make hexagonal nuts 1¼" x ¾". These bars 1 are rolled hot in long rolls 4 and 5, timed accurately by operating gears, the bar 1 being used as it is still hot in the rolling mill in the course of being rolled down from billet size. These rolls 4 and 5 have long grooves extending thereacross, parallel to their axes, and forming spaced teeth 6 so shaped as to give the desired shape to the nut-blank bar. The object of the invention is economically to roll these bars 1 into the desired nut-blank bar and with a minimum loss of material. To this end, the bars 1 are so rolled as to provide a nut-blank bar from which hexagonal nuts may be severed in the position shown in Figure 5, i. e., a flat side 17 of the nut is formed adjacent the top and bottom faces 2 of the bar 1. This result is effected with a minimum loss of material and with the production of a nut of the desired size by means of making the teeth 6 formed upon the rolls 4 and 5 narrow in proportion to their height substantially as shown in the drawings, the peripheral portions of the rolls between adjacent teeth having a curvature materially sharper than would be true if these portions were in the circumference of a circle whose diameter was equal to the diameter of the rolls 4 and 5 at the root of the teeth. This is plainly illustrated in Figure 3, wherein an arc 10 of a circle having the same diameter as the diameter of the roll at the root of the teeth is shown, as distinguished from the roll section 11 forming the arc of a circle having a diameter considerably less than the diameter of the roll 4, the roll sections 11 pressing upon the bar 1 between the teeth 6 in a manner and with a result hereinafter fully described. The height of opposed teeth 6 is so great as to space the bottoms of the same closer together than the length 17 of a side of the proposed nut, whereby the latter are formed in the nut-blank bar with two of their apices 18 lying centrally of the depth of the bar, as shown in Figure 5.

Figure 4:
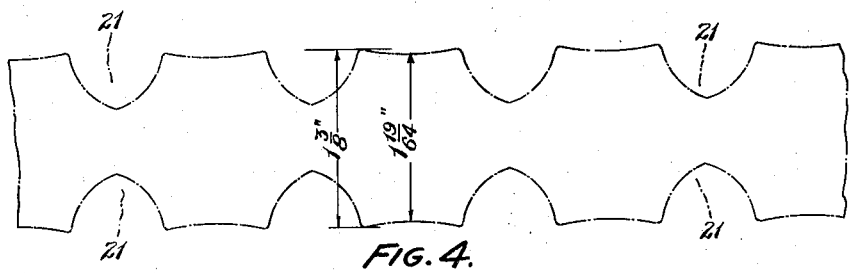
Figure 4 is a diagrammatic view of the space described by the roll teeth and inter-teeth surfaces shown in Figure 3.

The result of working upon hot bars with high teeth 6, and interteeth sections which press upon the bar, in the digging of these teeth into the faces 2 of the bar 1 to a depth shown in Figure 5, the elongation of the bar with slight lateral distortion, and the formation of a finished bar blank having plane portions 14 between the adjacent recesses 21 formed by the teeth 6. It will be noted that this formation of bar blank shown in Figure 5 provides for the cutting of nuts therefrom with angles 18 of the nut taken from the center of the bar blank and side faces 17 taken from the top and bottom of the bar blank. The bar portions 14 between the spaces 21 are flat because of the character of the surfaces 11 of the rolls shown in Figure 3. The mid-points of these surfaces 11 of the rolls 4 and 5 when they most closely approach each other are spaced apart a distance equal to that which it is desired to obtain in the greatest depth of the finished blank bar. This depth, for instance, is 1-19/64 inches, as shown in Figure 4, when it is desired to produce a nut having a depth of 1¼ inches. It will be recalled that the depth of the bar 1 is 1-3/8 inches. The other opposed points of the sections 11 are spaced apart progressively from the center to the ends of the sections 11 a greater distance than the mid-points, as shown in Figure 4. The effect of rolling a bar of this size with rolling surfaces which are spaced from 1-19/64 inches apart at their mid-points to 1-3/8 inches apart at their ends, while at the same time digging into the bar with the deep teeth 6, is to cause the corners 23 adjacent the spaces 21 to be formed square and to be kept intact to the extent of not being broken down by the pressure of the teeth 6 further than the 1-19/64 inches spacing, thus resulting in plane surfaces 14, 1-19/64 inches apart, as plainly shown in Figure 5. The action consists in rolling the face surfaces of the bar 1 intermediate the spaces 21, the rolling pressure being progressively in amount from the extreme corners of the recesses 21, where the pressure is not sufficient to produce any rolling action, to a maximum rolling pressure at the center of said face surfaces, resulting in the plane surfaces 14. There is also shown in Figure 5, in dot-and-dash lines, as regards one of the portions 15 of the blank between the recesses 21, the effect which would be produced if the bar 1 were passed between rolls whose peripheral sections between teeth did not press upon the bar. This effect is more graphically shown in Figures 6, 6$^a$ and 6$^b$, wherein it will be noted that the sections 15 between the recesses 21' are curved in an arc extending from adjacent broken-down corners 20 adjacent contiguous recesses 21', the greatest distance between the surfaces 15 at the center thereof being equal to the original depth 3 of the bar side 1. The distance between opposed broken-down corners 20 is considerably less than 1-19/64 inches. It will be plainly noted from Figure 5 that the trimming necessary to cut the nut is very slight, consisting only of the trim portions 19 and 19'. Before the bar blanks are trimmed, however, I flatten the sides of the same by means of a pair of rolls 22, Figure 17. The reason that it is advisable thus to flatten these sides is plainly shown in Figures 9 to 12. When the bar 1 passes through the rolls 4 and 5, the sides 3 of the same are slightly bulged from top to bottom, as illustrated by the ordinal 3', Figure 12, and bulged more, adjacent the bottoms of the recesses 21, as illustrated by the ordinal 3$^2$, this bulge 3$^2$ tapering off at points midway between the top and bottom as illustrated by the ordinal 3$^3$, Figure 11. These protuberances produced by this lateral distortion of the bar blank are pressed back into the bar by the rolls 22 through which the blank shown in Figure 5 is passed, and the bar blank is given the shape plainly shown in Figures 18, 19 and 20.

It is well known that the action of rolls having blunt teeth upon bars of this character is to distort the bar laterally and to break down the corners adjacent the tops of the recesses formed by the teeth, the top and bottom portions of the bar never being built up or increased in height or depth because it is impossible to cause the material acted upon by the rolls to flow in a direction opposite that in which the pressure of the roll teeth is applied. I illustrate this in Figures 13 to 16, wherein is shown the effect of the action of rolls having blunt teeth 26 upon a bar 1 of the size shown in Figures 7 and 8. It will be noted that the action of the blunt teeth 26 is to decrease greatly the depth of the bar 1, so that a bar of the size noted would not be sufficient to make a nut 28 of 1¼ inch depth, because the deepest part of the portions 30 between the recesses 27 formed in the bar by the blunt teeth 26 lies well within the necessary depth for a nut of the size indicated. This is illustrated by the dotted nuts 28 and 28', Figure 13. The lateral distortion of the bar 1 by teeth of the character illustrated by the ordinal 26 is well shown in Figures 15 and 16. It is evident, then, that considerably more blank material would be necessary to form the nut 28 than is furnished by a bar of the size shown in Figures 7 and 8, which bar, however, is adequate to furnish nuts of the same size when operated upon by rolls of the character shown in Figure 3, having the pressing sections 11 between tooth portions and the deep teeth 6, as shown.

I direct particular attention to the improved form of rolls 4 and 5, having the long spaced teeth 6 running parallel with the axes of the rolls. Due to the character of the teeth, no side guides are necessary in the rolls, in order to prevent undue lateral distortion of the blank, and the rolls 4 and 5 can be utilized for a great length of time simply by shifting the blank guide 8 upon the guide support 9 as fast as portions of the rolls 4 and 5 are worn out or impaired until the full length of the rolls 4 and 5 is utilized, which will cover a comparatively great length of time for operations of this character. For instance, rolls 4 and 5 may be 24" or more in length, whereby there will be provided sufficient rolling surface for a long period of service. Instead of forming the rolls 4 and 5 with long unitary grooves, a plurality of spaced milled sections might be formed therein serving for successive use as fast as one section was impaired or worn out. It is possible to make a fairly satisfactory nut bar with rolls of the character of the rolls 4 and 5 which do not have the convex surfaces 11 but which are provided with inter-teeth surfaces having the same curvature as the roll. The bar thus produced would be one similar to that shown in Figure 6 and would not be as good a bar as that shown in Figure 5 but might be satisfactory for certain purposes and under certain conditions.

What I claim is:

1. A roll for manufacturing nut-blank bars having spaced teeth parallel with its axis of a length equal to the aggregate thickness of a plurality of the proposed nuts, the peripheral roll sections intermediate said teeth lying in the circumference of a circle having a shorter diameter than the diameter of the roll at the root of the teeth.

2. A roll for manufacturing nut-blank bars having spaced teeth parallel with its axis of a length equal to the aggregate thickness of a plurality of the proposed nuts, said teeth being narrow relative to their height, the peripheral roll sections intermediate said teeth lying in the circumference of a circle having a shorter diameter than the diameter of the roll at the root of the teeth.

3. A roll for manufacturing nut-blank bars for hexagonal nuts of ¾" depth, having spaced teeth of 24" or greater length parallel with its axis, the peripheral roll sections intermediate said teeth lying in the circumference of a circle having a shorter diameter than the diameter of the rolls at the root of the teeth.

4. A roll for manufacturing nut-blank bars for hexagonal nuts of ¾" depth, having spaced teeth of 24" or greater length parallel with its axis, said teeth being narrow relative to their height, the peripheral roll sections intermediate said teeth lying in the circumference of a circle having a shorter diameter than the diameter of the rolls at the root of the teeth.

5. A roll for manufacturing nut-blank bars spaced teeth which are narrow in proportion to their height, and which are disposed parallel to the axis of the roll and are of a length equal to the aggregate thickness of a plurality of the proposed nuts, whereby no roll side guides are necessary and the roll can be utilized for a comparatively long service by successively using un-used portions thereof as fast as the roll is worn out or impaired.

6. A roll for manufacturing nut-blank bars having spaced teeth and peripheral surfaces intermediate said teeth lying in the circumference of a circle of smaller diameter than the diameter of the roll at the base of the teeth.

7. A roll for manufacturing nut-blank bars having spaced teeth and peripheral surfaces intermediate said teeth lying in the circumference of a circle of smaller diameter than the diameter of the roll at the base of the teeth, said roll teeth being sharp and comparatively high relative to their width.

8. In means for forming nut-blank bars, a pair of cooperative opposed rolls having oppositely disposed teeth and opposed peripheral surfaces intermediate said teeth lying in the circumference of a circle of smaller diameter than the diameter of the rolls at the base of the teeth, some of the opposed portions of said peripheral surfaces being spaced apart a distance less than the depth of the bar to be accommodated, and means for supporting and actuating said rolls.

9. In means for forming nut-blank bars, a pair of cooperative opposed rolls having oppositely disposed teeth and opposed peripheral convex surfaces intermediate said teeth whose extremities when opposed are spaced apart a distatnce equal to the depth of the bar to be accommodated and whose side edges when opposed are spaced apart a distance less than the depth of the bar to be accommodated, and means for supporting and actuating said rolls.

10. In a method of manufacturing nut-blank bars, the step which consists, in rolling spaced recesses in the opposite faces of a bar, while rolling the bar face surfaces intermediate and at points spaced from the edges of said recesses.

11. In a method of manufacturing nut-blank bars, the step which consists, in rolling spaced recesses in the opposite faces of a bar, while rolling the bar face surfaces intermediate said recesses progressively in amount from the corners of said recesses to the centers of the respective surfaces to make said surfaces flat.

12. In a method of manufacturing nut-blank bars, the step which consists, in rolling spaced recesses in the opposite faces of a bar, while maintaining non-rolling pressure on the extreme corners of said recesses and rolling the bar face surfaces intermediate said recesses progressively in amount from said corners to the centers of the respective surfaces to make said surfaces flat.

13. In a method of manufacturing nut-blank bars, the steps which consist, in rolling spaced recesses in the opposite faces of a bar while rolling the bar face surfaces intermediate said recesses; and, then, in passing the bar through pressure rolls to press the lateral protuberances formed by the first rolls back into the bar.

14. In a method of manufacturing nut-blank bars, the steps which consist, in rolling spaced recesses in the opposite faces of a bar while rolling the bar face surfaces intermediate said recesses progressively in amount from the corners of said recesses to the centers of the respective surfaces to make said surfaces flat; and, then, in passing the bar through pressure rolls to press the lateral protuberances formed by the first rolls back into the bar.

15. Means for producing rolled blank bars in which the ends of the blanks are defined by notches in opposite faces of the bars and the side edges of the blanks are plane, comprising opposed rolls having opposed notch forming teeth and portions intermediate said teeth the longitudinal edges of which have non-rolling contact with the bar and the central portions of which have rolling contact therewith.

16. Means for producing rolled blank bars in which the ends of the blanks are defined by notches in opposite faces of the bars and the side edges of the blanks are plane, comprising opposed rolls having opposed notch forming teeth and portions intermediate said teeth the longitudinal edges of which have non-rolling contact with the bar, the surfaces of said portions receding from the axis of the rolls from their longitudinal edges to the centers thereof and at their centers having rolling contact with the bar.

Signed by me this 5 day of June, 1926.

GEORGE F. WOELFEL.